United States Patent [19]

Thurm et al.

[11] 4,274,732

[45] Jun. 23, 1981

[54] METHOD AND APPARATUS FOR MAKING REPRODUCTIONS OF COLOR FILM FRAMES

[75] Inventors: Siegfried Thurm, Voiswinkel; Konrad Bunge, Cologne, both of Fed. Rep. of Germany

[73] Assignee: AGFA-Gevaert, A.G., Leverkusen, Fed. Rep. of Germany

[21] Appl. No.: 5,514

[22] Filed: Jan. 22, 1979

[30] Foreign Application Priority Data

Jan. 26, 1978 [DE] Fed. Rep. of Germany ....... 2803381

[51] Int. Cl.³ ............................................ G03B 27/73
[52] U.S. Cl. ...................................... 355/38; 355/77
[58] Field of Search .............................. 355/32, 35–38, 355/67–71, 83, 88, 77

[56] References Cited

U.S. PATENT DOCUMENTS

| | | | |
|---|---|---|---|
| 3,685,900 | 8/1972 | Kirby et al. ....................... | 355/71 X |
| 3,709,601 | 1/1973 | Zahn et al. ............................... | 355/35 |
| 3,937,573 | 2/1976 | Rising ................................. | 355/35 X |
| 4,087,180 | 5/1978 | Di Natale ......................... | 355/32 X |

*Primary Examiner*—L. T. Hix
*Assistant Examiner*—W. J. Brady
*Attorney, Agent, or Firm*—Peter K. Kontler

[57] ABSTRACT

The exposed and developed frames of a color film are copied on the basis of information which is obtained by scanning the density of each frame in primary colors as well as on the basis of information which is obtained by imaging a series of gray filters having different densities onto one or more portions of the film outside of the film frames and scanning the density of the image of each filter. The information which is obtained as a result of such scanning is processed by a computer or an amplifier which controls the quantity of copying light in each of the primary colors, either by selecting the interval of exposure of each frame to light in each of the primary colors by controlling the intensity of light in each of the primary colors (if the exposure times in each of the primary colors are identical). The filters can be imaged prior to exposure of frames to scene light and/or shortly prior to development of the film in a processing laboratory. The difference between the results of scanning of filter images which are exposed prior to exposure of frames to scene light and the results of scanning of filter images exposed immediately or shortly prior to development of the film is indicative of changes in characteristics of the material of a film during the interval which elapses between the making of first and second exposures of filters.

24 Claims, 3 Drawing Figures

METHOD AND APPARATUS FOR MAKING REPRODUCTIONS OF COLOR FILM FRAMES

BACKGROUND OF THE INVENTION

The present invention relates to a method and apparatus for determining the quantity of copying light during reproduction of images on color originals, especially color photographic negatives, onto photosensitive material. More particularly, the invention relates to improvements in a method and apparatus for ascertaining appropriate quantities of light in the primary colors during reproduction of images on color originals onto photographic paper on the like. Still more particularly, the invention relates to a method and apparatus for ascertaining the quantities of copying light in several colors on the basis of evaluation of so-called test exposures which are provided on the originals outside of the image bearing areas.

U.S. Pat. No. 2,269,161 to Morse discloses a method of reproducing a multicolored photograph which includes preparing by the same process, with identical materials and under identical processing conditions, an approximately neutral color photographic record of a neutral colored light of known spectral distribution, noting the departure of the record from the neutral color, duplicating the photograph, and controlling the relative amounts of the primary colors in the duplicate in accordance with the amount of departure. The patented method is intended to compensate for color departures of the record from neutral colored light. It has been found that this method fails to insure the making of satisfactory reproductions (a) when the original was exposed to light other than that which is best suited for the making of acceptable exposures (a typical example is a daylight film which was exposed in artificial light or vice versa), and (b) when the condition of latent images changes during the interval which elapses between exposure and development.

For example, an exposure which was made shortly before sundown will be too red. On the other hand, an exposure which is made on a cloudy day is likely to contain excessive amounts of blue light.

OBJECTS AND SUMMARY OF THE INVENTION

An object of the invention is to provide a novel and improved method of ascertaining proper quantities of copying light during reproduction of images of originals which were exposed under normal or abnormal circumstances.

Another object of the invention is to insure proper reproduction of images on color films whose frames were exposed earlier than the test exposures, and regardless of the length of intervals which elapse between the exposure of film frames and the making of test exposures.

A further object of the invention is to provide a novel and improved apparatus for the making of reproductions in accordance with the above outlined method.

An additional object of the invention is to provide a novel and improved method of evaluating test exposures and exposed film frames for the purpose of regulating the quantity of copying light in each of the primary colors during reproduction of images of exposed and developed film frames onto photographic paper or the like.

One feature of the invention resides in the provision of a method of reproducing images (e.g., exposed and developed film frames) which are exposed on a color original (such as a color negative film) before the original is treated in a developing machine. The method comprises the steps of applying to the original at least one test exposure outside of the images prior to development of the original (the test exposure may consist of the images of a series of gray filters having different densities), monitoring the characteristics of the test exposure in each of the primary colors (blue, green and red) subsequent to development of the original, monitoring the characteristics of each image to be reproduced in the primary colors subsequent to development of the original, reproducing the images to be reproduced onto photosensitive material (such as photographic paper) including directing copying light against the respective images, and regulating (for each image to be reproduced) the quantity of copying light in each of the primary colors as a function of the combined results of monitoring the characteristics of the test exposure and the respective image. Thus, the quantity of copying light in each primary color is regulated in dependency on density or another characteristic of the test exposure (which is tantamount to determination of characteristic of the original) as well as in dependency on density or another characteristic of the image (exposed and developed film frame).

The step of applying a test exposure can be carried out shortly prior to development of the original, e.g., immediately ahead of the copying station, or such step may precede the exposure of original to scene light (in the latter instance, the test exposure can be made simultaneously with exposure of numerals which denote successive film frames of a customer film).

The method may include an applying step which comprises making a first test exposure on the original outside of the images prior to exposure of film frames to scene light and making a second test exposure on the original immediately or shortly prior to development of the original. The first and second test exposures can be applied to spaced-apart portions of the original outside of the images, i.e., outside of the film frames. Such method may further comprise the step of ascertaining the differences between the monitored characteristics of the first and second test exposures, and the regulating step then comprises selecting the quantities of copying light as a function of deviation of the aforementioned differences from the results of monitoring the images of the original. The quantities of copying light can be selected to a greater extent on the basis of the results of monitoring the test exposures if the aforementioned differences are pronounced. Alternatively, the quantities of copying light can be selected to a greater extent in dependency on the results of monitoring the images of the original.

In accordance with a further embodiment of the method, one can ascertain the neutral density of each image to be reproduced. The first monitoring step then includes ascertaining the average density of each section of a test exposure (i.e., the average density of the image of each of several gray filters) and the regulating step then includes selecting for regulation of the quantity of copying light the average density of the image of one or more filters whose average density is nearest to the neutral density of the respective image of the original. The selecting step can be carried out by resorting to graphical interpolation or automatically by resorting to a suitable computer. The computer can select the average densities of images of two filters whose average densities are nearest to neutral density of the image to be reproduced.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
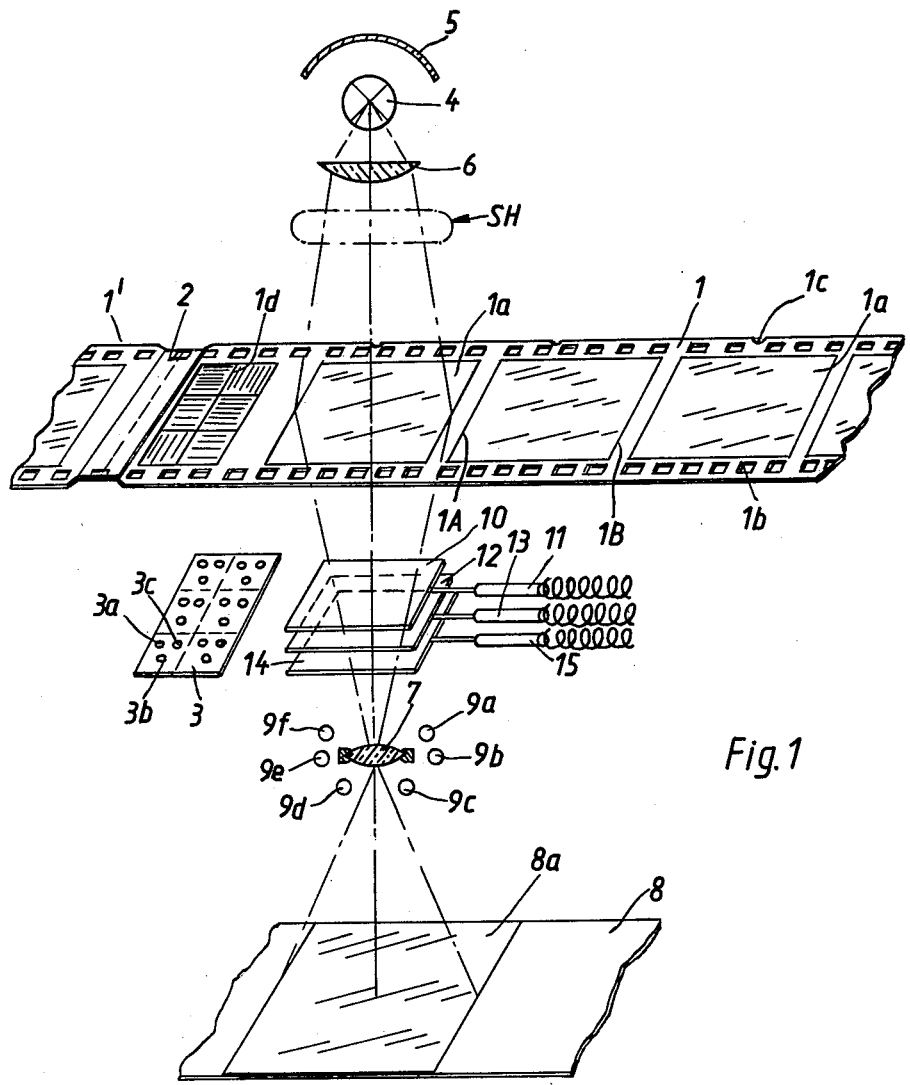
FIG. 1 is a perspective view of a portion of a copying machine including an apparatus which embodies one form of the invention.

FIG. 1 shows a web which consists of several exposed color photographic films including films 1 and 1' which are spliced together end-to-end to form an elongated body adapted to be transported through a developing machine and thereupon through a copying machine for the making of reproductions of the images of successive or selected film frames 1a. The customary perforations of the spliced-together films 1 and 1' are shown at 1b. As a rule, the spacing of frames 1a is not uniform, in contrast to the spacing of perforations 1b, i.e., it is not possible to accurately align successive film frames 1a with the copying station by the simple expedient of moving each n-th perforation 1b in the one or the other marginal portion of a film to a predetermined position. Therefore, the films are provided with suitable indicia 1c (e.g., holes having a substantially semicircular outline to be readily distinguished from the perforations 1b) each of which is applied to the corresponding film in a predetermined position with respect to the adjacent frame 1a. The indicia 1c are applied subsequent to development of films 1 and 1' and subsequent to photoelectric scanning of developed frames 1a in order to ascertain the leading and trailing edges 1A and 1B of each frame.

The reference character 2 denotes a splice including a uniting band (e.g., a portion of adhesive tape) which is used to connect the trailing end of the preceding film 1' to the leader of the next-following film 1. The transport of a large number of spliced-together films through the copying machine saves time because it is not necessary to thread the leader of each and every film through the copying station. The illustrated films are assumed to be narrow, i.e., their frames 1a are relatively small. The web which consists of several films is rolled up when it leaves the developing machine for convenient transport to the copying station.

I images of a gray object (namely of six filters) are exposed in the region between the splice 2 and the foremost frame 1a of the right-hand film 1. These images constitute a six-stage gray scale 1d. The exposure can be effected in accordance with a contact or other process, depending on the size; and five of the six filters which are imaged have density values of 0, 1, 2, 3 and 4. The sixth filter consists of opaque material whose light transmissivity is zero. The quantity of light during exposure of the gray scale 1d is selected in such a way that the reproduction of the gray filter with the density value 3 exhibits a medium density which is approximately 0.6 above the average density of unexposed film material. The color temperature of the light source conforms to the material of the film 1 or 1'. The exposure of several gray filters having different densities is necessary because the available negative film materials exhibit negatives of dissimilar average density within one and the same film (overexposure, underexposure and normal exposure) so that the making of satisfactory reproductions necessitates the establishment of different ratios of quantities of copying light in the primary colors. The timing of the application of the gray scales or test exposures 1d can be varied; however, the time at which the test exposures 1d were applied should be known for proper evaluation of the test exposures 1d. It is advisable to make the test exposures 1d shortly prior to development of the films 1 or 1' or simultaneously with exposure of numerals denoting consecutive frames of a film 1 or 1', i.e., prior to exposure of the film frames 1a to scene light.

Highly satisfactory information regarding possible changes of the latent image can be obtained if the film 1 or 1' is provided with two test exposures 1d, one during the exposure of the aforementioned numerals and the other shortly prior to development of the film 1 or 1'. The two test exposures 1d are applied to different fields or parts of the respective film 1 or 1' outside of the frames 1a. The differences between the results of evaluation of the two sets of test exposures 1d are indicative of the maximum changes of latent images. If such differences are pronounced, one can attempt to ascertain the differences by detecting a yellow-green shade and to select the quantity of coloring light on the basis of evaluation of that test exposure 1d which was applied simultaneously with the exposure of numerals, or to attribute greater importance to monitored values which are characteristic of the density of film frames 1a in each of the primary colors.

In the illustrated films 1 and 1', whose format is small, the dimensions of the test exposures 1d can be selected in such a way that the density, in each of the three primary colors, can be readily ascertained for each of the six sections by resorting to a photocell which is placed in close proximity to the film. The monitoring or measuring device 3 comprises six fields, one for each section of the test exposure 1d, and each such field comprises a set of three photocells 3a, 3b, 3c each sensitized for a different one of the primary colors. Thus, one can obtain eighteen simultaneous signals, three for each section of the test exposure 1d. A light source (not shown) is placed at one side of the test exposure 1d and the monitoring device 3 is located at the other side of and close to the test exposure. The six sets of cells 3a-3c are then exposed to light which passes through the respective sections of the test exposure 1d.

Instead of using eighteen discrete cells, the monitoring device 3 may be simplified by utilizing only one set of three cells 3a-3c and by exposing such cells to light which passes through successive sections of the test exposure 1d.

A copying machine which is adajacent to the monitoring device 3 comprises a source 4 of copying light, a reflector 5 behind the source 4 and a condensor lens 6 between the source 4 and the film path. The condensor 6 insures uniform illumination of the film frame 1a which is located at the copying station. The parts 4-6 are located at one side of the film path and the copying machine further comprises several components at the other side of the film path. Such components include an objective 7 which focuses the image of the film frame 1a below the condensor lens 6 onto the registering portion 8a of a strip of photographic paper 8 or the like. The objective 7 is surrounded by a group of photocells 9a-9f which are sensitized in the three primary colors and which form part of an exposure control circuit shown in FIG. 2. The aforementioned components further include three subtractive filters 10, 12 and 14 which can be moved into and from the path of light between the film path and the objective 7 by electromagnets 11, 13 and 15. It is clear that the filters 10, 12 and 14 can be installed at any point of the path of copying light between the source 4 and the strip 8, e.g., between the source 4 and the film path or between the objective 7 and the strip 8.

Figure 2:
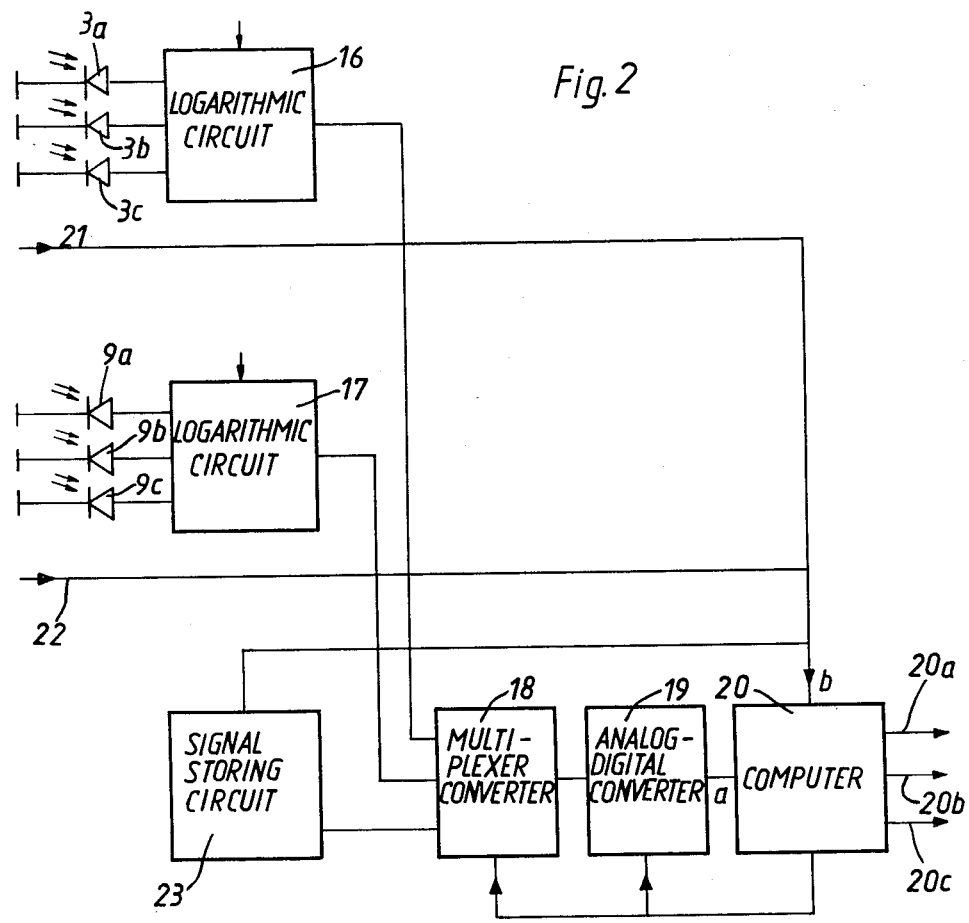
FIG. 2 is a circuit diagram of the apparatus.

The exposure control circuit of FIG. 2 comprises the photoelectric monitoring elements 3a-3c and 9a-9f. Each of the elements 3a-3c may constitute a photodiode and these elements are assumed to transmit signals in response to monitoring of successive sections of the test exposure 1d. Their outputs are connected to a logarithmic circuit 16 which converts signals denoting the transmissivity of monitored sections of the test exposure 1d into density signals. Analogously, the outputs of the monitoring elements 9a-9c are connected to the corresponding inputs of a second logarithmic circuit 17. The signals which are transmitted by the elements 9a-9c denote the transmissivity of the aligned film frame 1a in the respective primary colors, and such signals are converted into corresponding density signals. The density signals at the outputs of the circuits 16, 17 are transmitted to a multiplexer circuit 18 which is connected with an analog-to-digital converter circuit 19. The output of the circuit 19 is connected with the first input a of a computer 20 which transmits signals via outputs 20a, 20b, 20c to the electromagnets 11, 13 and 15. The computer 20 can be replaced by an additive amplifier (not shown) or similar means for regulating the quantity of copying light in the primary colors.

The computer 20 has a second input b which receives signals via conductor means 21. The signals which are transmitted via conductor means 21 denote that the monitoring device 3 is properly aligned with the test exposure 1d. Furthermore, conductor means 21 transmits signals in response to scanning of successive sections of the test exposure 1d. The input b of the computer 20 is further connected with conductor means 22 for transmission of signals denoting the detection of successive indicia 1c, i.e., each signal which is transmitted via conductor means 22 denotes that a frame 1a which is to be copied is properly aligned with the copying station.

A signal storing circuit 23 stores information denoting the characteristics of films and photosensitive material 8. Such information is taken into consideration during exposure of images of film frames 1a at the copying station, namely, for determination of appropriate exposure times.

The computer 20 carries out the following calculations:

Density signals which are furnished by the circuits 16 and 17 are processed to adapt the densitometers (3a-3c, 16 and 9a-9c, 17) to the combination of the illuminating system 4-7, the negative material 1 or 1' and the characteristics of the photographic paper 8. This renders it possible to apply additive and multiplicative constants which must be variable. Such adaptation of the densitometers 3a-3c, 16; 9a-9f, 10 is necessary in order to allow for qualitative and quantitative determination of possible color deviations in the same way in which they are reproduced on the positive material 8. The ascertainment of adaptation is carried out as follows:

A series of gray filters, each having a different density, is imaged onto the negative material in such a way as to cover the entire exposure range of the film. For example, the densities of various filters may range from 0 to 6 with a difference of 0.2 between the densities of two neighboring filters of the series. The quantity of light is constant. In the next step, an illuminating system is adjusted in such a way that the filter having the density value one is copied neutral gray. In the next-following step, the illumination remains unchanged and one ascertains empirically those exposure times in the three colors which are necessary to produce identical neutral gray copies from the copies of other gray filters. The ratio of exposure times which are needed to obtain identical copies of the test exposure section with a density value one and of other sections of the test exposure can be used to ascertain the ratio of transparencies and hence the differences between densities such as are recorded by the positive material.

In the next step, the densities of sections of the test exposure are measured by the densitometers (the parts 3a-3c, 16 constitute a first densitometer and the parts 9a-9c, 17 constitute a second densitometer) which are to be calibrated and the differences between the measured density of the section with the density value one and the measured densities of other sections are calculated to be compared with the empirically ascertained differences. Thus, one obtains a calibration table which allows for determination of density differences (on the basis of measurements carried out by the densitometers) in the same way as the differences are registered by the positive material. By resorting to empirical determination of values on the calibration table with the help from test exposure sections having different densities, one takes into consideration the so-called Schwarzschild effect of photosensitive layers of the positive material.

The calibration of densitometers is an empirical procedure which involves the making of test prints, and the exposure values which were used for the making of most satisfactory prints are stored. The stored information is used for calibration.

For each of the six sections of the gray scale 1d, one obtains three color densities d f b, d f g and d f r. In the next step, one calculates the average or neutral density d f n for each of the six sections. Such calculation simply involved addition of the respective densities d f b, d f g and d f r and division of the resulting sum by three. If desired or necessary, the neutral density d f n can be ascertained by restoring to suitable constants or factors to attribute greater importance to one or more color density values than to the other color density value or values.

Figure 3:
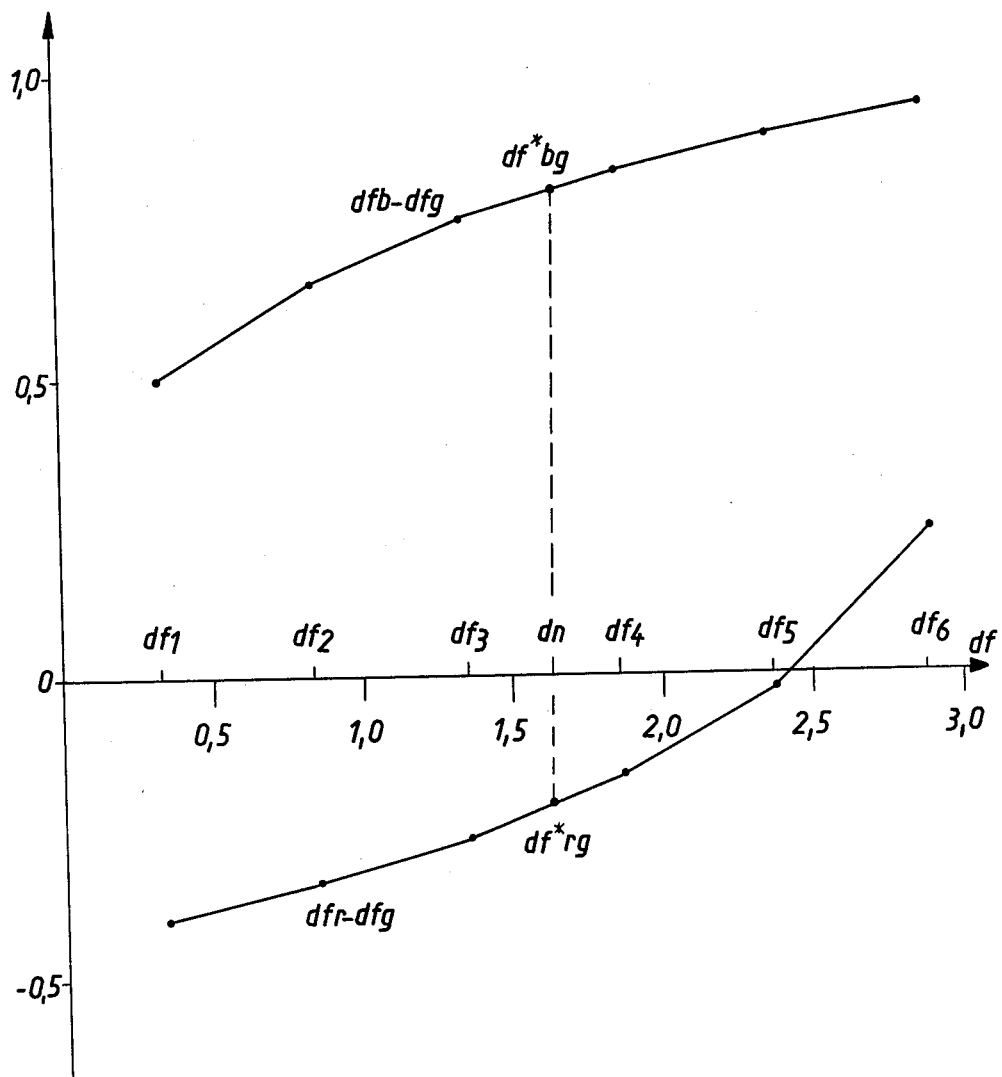
FIG. 3 is a graphic representation of color density differences between the images of gray filters forming a test exposure on an average photographic film.

In a further step, the computer 20 calculates the differences between the blue and green as well as between the green and red density values in accordance with the equations d f b g = d f b − d f g and d f r g = d f r − d f g. The corresponding values, together with the neutral density d f n for each section of the test exposure 1d, are stored in the computer 20. Thus, the computer stores six values d f b g, six values d f r g and six values d f n. Such values can be illustrated in a manner as shown in FIG. 3. The density values are measured along the abscissa, and the color density differences d f b=d f g and d f r−d f g are measured along the ordinate in line with the corresponding neutral density values d f 1 ... 6. The two curves are characteristic of a particular film type and their configuration is indicative of possible changes of sensitivity of the corresponding film type during the interval preceding the making of test exposures.

The sensitivity of films can be ascertained by making two test exposures 1d, one simultaneously with the exposure of numerals adjacent to the film frames 1a (i.e., prior to exposure of film frames to scene light) and the other immediately prior to development of the film 1. By comparing the two test exposures 1d (such exposures 1d are applied to different portions of the film 1 and are made at different times), one can ascertain possible pronounced changes of sensitivity as a result of prolonged storage of latent images and/or under the influence of temperature of the surrounding atmosphere. The two test exposures 1d can be monitored simultaneously, prior to exposure of film frames 1a to printing light, by resorting to two densitometers each including a group of photocells 3a-3c and a circuit 16. The results can be evaluated by the computer 20, in accordance with a relatively simple technique, in such a way that when the change of sensitivity or another characteristic of film 1 between the times of making the two test exposures 1d is very pronounced (e.g., due to changes which are caused by temperature and/or duration of storage between the two test exposures), the exposure of film frames 1a at the copying station is effected on the basis of data which are ascertained from evaluation of the corresponding frames 1a, i.e., the test exposures 1d are disregarded. In such instances, one carries out a neutral gray compensation on the basis of evaluation of film frames 1a. This results in the making of satisfactory prints from 80-90% of film frames 1a; the prints are less satisfactory only when a frame 1a exhibits a dominant color.

The differences between the results of evaluation of the two test exposures 1a do not furnish accurate information as to the manner in which the colors have changed between the time of exposure of film frames 1a to scene light and the time of development of film frames. However, such differences enable one to reach a conclusion that, when the differences are small, the deleterious effect of storage between the making of first and second test exposures 1a is small or negligible. Therefore, greater importance can be attributed to the results of evaluation of test exposures 1d than in the event when the aforementioned differences are pronounced, i.e., when one can conclude that unsatisfactory relationship between the time of exposure to scene light and the interval of storage between first and second test exposures warrants a very critical evaluation of the results of test exposures 1a. The results of evaluation of test exposures 1d are then considered to a lesser extent during the making of prints. When the differences are very pronounced, the coefficient (1-c′) which denotes the influence of results of examination of test exposures 1d during the making of prints is less than 0.5. The coefficient (c′) which denotes the results of evaluation of film frames is increased accordingly, i.e., it exceeds 0.5.

The manner in which the first or second test exposures can be made is disclosed in the commonly owned copending application Ser. No. 5,515 filed Jan. 12, 1979, by Friedrich Hujer.

In accordance with a more complex correction method, one can distinguish between exposures 1a which were made prior to storage (i.e., before the change of sensitivity took place) and whose latent images are strongly influenced by storage, and exposures 1d which were made shortly prior to development. The copying of frames 1a which were exposed prior to storage is carried out by considering the first test exposure 1d (made prior to storage, i.e., simultaneously with exposure of numerals identifying the film frames 1a), and the copying of frames 1a which were exposed shortly prior to development is carried out by considering the test exposure 1d which was made immediately or shortly prior to development. The two groups of film frames 1a can be ascertained by examining the color densities of the frames 1a because it is known that, when a latent image is stored for a relatively long interval of time, it exhibits a pronounced yellow-green hue.

The improved method renders it possible to ascertain the neutral density of each film frame 1a, i.e., the arithmetic mean of the three integral color densities. Under certain circumstances, determination of neutral density can be achieved by resorting (instead of the color density values of the entire frame 1a) to the color density values of one or more important portions of a film frame, for example, by ascertaining the arithmetic mean of the color density values of the central portion of a frame 1a which normally bears the most important part of the image. Simple linear interpolation on the basis of the diagram shown in FIG. 3 renders it possible to ascertain the two color density differences which correspond to the neutral density value. The color density differences are characteristic of properties of the material of the film 1 or 1′ at such average illumination. The computer 20 can calculate the just discussed values which are characteristic of the film 1. For example, a simplified version includes determination of difference values corresponding to the neutral density of that section of the test exposure 1d which is nearest to the neutral density of the film 1 or 1′. A more complex and more accurate determination involves the mathematical version of the interpolation according to FIG. 3.

Based on the thus ascertained color density differences which are characteristic of the film 1 or 1′, and on the corresponding neutral density, one can determine the characteristic densities d f* b, g, r of individual colors. On the basis of such characteristic color densities, the movement of filters 10, 12, 14 in the course of a copying operation can be controlled in such a way that one obtains an objectively accurate reproduction of colors save for certain changes of film characteristics between the interval of exposure of a film frame 1a and the making of the test exposure 1d. This is achieved by filtering in such a way that one obtains a neutral gray for the sections of test exposure having a corresponding density.

In order to take into consideration eventual errors which are caused by the film frames 1a, one can resort to a mixed color density based on evaluation of the test exposure 1d and on evaluation of the negative. The averaged color densities can be expressed as follows:

$$d\ b,\ g,\ r = c' b,\ g,\ r,\ \cdot d\ n\ b,\ g,\ r + (1 - c'\ b,\ g,\ r)\ d f^* b\ g\ r$$

wherein c' denotes the so-called mixing factor for blue, green and red colors which can be constant and, in accordance with the first approximation, equals 0.5. This means that the measurements denoting parameters which are characteristic of the film 1 and of the frame 1a are considered to the same extent during determination of averaged color densities. In the preceding equation, d n b, g and r denote the integral color density of film frames 1a. Instead of integral color density values, one can also resort to the measurement of certain portions of the film frame 1a or to especially important or derived color density values. Referring again to the preceding equation, d f* b, g and r denote the color densities which are characteristic of the film 1 or 1' and are indicative of deviation of the images of sections of the test exposure 1d from neutral gray. The equations d n g b=d n b−d n g and d n r g=d n r−d n g denote the corresponding color density differences. The same applies for the color density differences of the test exposure values d f* b g and d f* r g. The mixing factor c' need not be a constant but rather may be a function of d f* b g−d n b g and d f* r g−d n r g, i.e., c' can be less than 0.5 when the deviation of density differences of the film frame 1a from the difference values of corresponding sections of the test exposure 1d is rather pronounced. In such instances, the data which are specific of the film 1 or 1' are considered to a greater extent based on the knowledge that, when the share of green in the data which are characteristic of the film frame 1a prevails, the dominant color of the subject is green. By attributing greater importance to the data which are characteristic of the film 1 or 1', the influence of this dominant color in the copy is reduced accordingly. The thus obtained averaged color density values can be further modified, in a manner known per se, in such a way that the copying time for reproduction of underexposed frames is longer but is shorter during copying of overexposed frames. This is achieved by multiplying the averaged densities with a factor $1-g \cdot (d\ n - d\ e)$ wherein g is a constant which equals 0.2 when d n<d e and which equals 0.3-0.5 when d n>d e, wherein d n denotes the neutral density of the corresponding negative and d e denotes the calibration density, i.e., the most frequent neutral density of negatives.

The thus obtained control density "s d b g r" can be converted into exposure time on the basis of the following equation: $z\ b,\ g,\ r = z\ e\ b,\ g,\ r \cdot 10^{(s\ d\ b,\ g,\ r - d\ e\ b,\ g,\ r)}$. In this equation, "z e b, g, r" denotes the calibration time which is determined empirically for a certain copying material charge as exposure time for acceptable copies on the basis of a calibration negative. The exponents "s d" denote the control density in the respective colors and "d e" denotes the density of the calibration negative in the same color. The actually required exposure times are determined by comparison with the exposure times which are required for the calibration negative.

Instead of the just discussed calculation of exposure times, it is also possible to resort to the so-called intensity regulation which involves exposure of the portion 8a of photographic paper to blue, green and red light for identical intervals of time. A shutter is closed to simultaneously complete the exposure in all three colors. Differences between the amounts of light in various colors are achieved by regulating the intensity of light in the respective colors, namely, by coloring the copying light, for example, by means of partly inserted color filters in a structure-free portion of the light beam. The extent to which the copying light is colored depends on the ascertained control density in the corresponding colors.

The operation of the apparatus of FIG. 1 is as follows:

The leader of the film 1 (such leader carries the six sections of the test exposure 1d) is introduced into the copying machine until the sections of the test exposure 1d register with the corresponding fields of the monitoring device 3. The monitoring elements 3a-3c thereupon scan the corresponding sections of the test exposure 1d, either simultaneously for all six sections or one section after the other, and transmit signals for storage in the computer 20 (via circuits 16, 18 and 19). The stored signals denote the density of corresponding sections in the particular colors.

The film 1 is thereupon advanced (if necessary) in a direction to the left, as viewed in FIG. 1, so as to place the foremost film frame 1a to be copied into register with the copying station. A shutter SH (indicated by phantom lines) is closed until the foremost frame 1a reaches the copying station and all three filters 10, 12, 14 are withdrawn from the path of copying light. When the shutter SH opens, the photocells 9 monitor the foremost film frame 1a to ascertain the integral density in the three primary colors. The computer 20 calculates the corresponding exposure times. Depending on the thus calculated exposure times, the computer 20 transmits signals via outputs 20a-20c to energize the corresponding electromagnets 11, 13, 15 and to move the associated filters 10, 12, 14 across the path of copying light to thereby terminate the exposure of portion 8a to light in the respective colors. When the third subtractive filter is moved across the path of copying light, copying of the image on the foremost frame 1a to be copied is completed. The shutter SH can be closed simultaneously with or subsequent to movement of the last subtractive filter to the light intercepting position.

The signals which were transmitted by the monitoring elements 3a-3c remain stored in the computer 20 and are available when the next film frame 1a to be copied moves into register with the copying station. On the other hand, the photocells 9 monitor each successive frame 1a (or each frame whose image is to be reproduced on the strip 8) and transmit signals to the computer 20 via circuits 17, 18 and 19. The same procedure is repeated, again and again, to obtain reproduction of all film frames 1a or of selected film frames 1a. The indicia 1c are monitored to insure that each frame 1a is arrested at a time when it registers with the copying station. Such indicia are applied only adjacent to the film frames 1a which are to be imaged onto the strip 8.

When the splice 2 enters the copying station, the computer 20 receives a signal denoting that the last frame 1a of the film 1 has been copied, and such signal effects the erasure of all signals which are stored in the computer, i.e., not only the signals which were transmitted by the photocells 9 during evaluation of the last film frame 1a but also the signals which were transmitted by the monitoring elements 3a-3c as a result of scanning of sections of the test exposure 1d at the leader of the film 1.

The web which consists of several spliced-together films is advanced again until the sections of the text exposure 1d on the leader of the next-following film move into register with the monitoring device 3. The aforementioned sequence of steps is thereupon repeated to insure the making of satisfactory reproductions of images of film frames 1a on the next-following film.

It is clear that the test exposure 1d can be applied to a different portion (i.e., not to the leader) of each film, that such test exposure can be smaller than that shown in FIG. 1, and that each film 1 or 1' can be provided with two or more test exposures 1d.

The aforedescribed method of evaluating test exposures for determination of data which are characteristic of the respective film and facilitate the ascertainment or selection of average neutral density of each film frame can be used with equal advantage when such evaluation does not take place in combination with discrete color densities of film frames 1a. For example, the method can be resorted to for controlling the conditions during exposure of film frames 1a in a studio or the like. In such instances, the utilization of data which are characteristic of the film for controlling the exposure insures satisfactory exposure of dominant colors.

The preceding part of the description deals exclusively with utilizaton of the improved method and apparatus for exposure or copying of entire film frames 1a. However, such method and apparatus can be used with equal advantage in connection with copying of originals by resorting to a laser beam which illuminates successive unit areas of an original. In ascertaining the quantities of copying light for successive unit areas or points of an image, the procedure is similar or analogous to the previously described procedure which involves simultaneous copying of all unit areas of an image. Each unit area can be said to constitute an image to be reproduced.

A further possibility of applying the improved method and apparatus is presented if the film is of the type disclosed in British Pat. No. 1,458,370 to which reference may be had, if necessary. Based on the spectral characteristics of such film, the results of monitoring of each point of the image must be corrected on the basis of the slope of darkening curves in order to insure proper determination of the quantities of copying light. Knowledge regarding such corrections can be gained by resorting to additional test exposures. In such instances, the quantity of copying light for each portion (e.g., unit area or point) of an image is determined by considering the images of all sections of a test exposure (i.e., not only one or two sections) if it is necessary to consider the gamma-curve for determination of the exposure.

The improved method and apparatus render it possible to take into consideration data (as determined by the monitoring device 3) which are characteristic of the material of an original as well as data (as determined by the monitoring elements 9) which are characteristic of the images of frames 1a. Moreover, and by relying on neutral gray compensation, the ratio of discrete color values in the film frames 1a is also considered in selection of the quantity of copying light in each of the primary colors. This renders it possible to compensate (at least in part) for certain factors which are likely to adversely influence the quality of reproductions, e.g., a pronounced color shade attributable to the nature of light which is used for exposure of one or more film frames.

Calibration of a color printer which can be used in the apparatus of the present invention is disclosed in detail in commonly owned U.S. Pat. No. 3,873,199 granted Mar. 25, 1975, to Volker Weinert. Reference may be had to the passage beginning in col. 5, line 36 and especially to the passage beginning in col. 7, line 18 of this patent. The disclosure of the patent to Weinert is incorporated herein by reference.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the claims.

We claim:

1. A method of reproducing images which are exposed on a color original, particularly a color negative, before the original is treated in a developing machine, comprising the steps of applying to the original at least one test exposure outside of said images and prior to development of the original; separately monitoring the characteristics of said test exposure in each of the primary colors subsequent to development of said original; separately monitoring the characteristics of each image to be reproduced in each of the primary colors subsequent to development of the original; and reproducing the images to be reproduced onto photosensitive material, including directing copying light against the respective images, and regulating, for each image to be reproduced, the quantity of copying light in each of the primary colors as a function of the respective results of separately monitoring the characteristics of said test exposure and the respective image.

2. The method of claim 1, wherein said applying step is carried out shortly prior to development of said original.

3. The method of claim 1, wherein said applying step precedes the exposure of said original to scene light.

4. The method of claim 1, wherein said applying step is carried out prior to exposure of said original to scene light, and further comprising the steps of applying to the original a second test exposure outside of the images and shortly before the development of said original, and separately monitoring the characteristics of said second test exposure in each of the primary colors subsequent to development of said original.

5. The method of claim 4, wherein said test exposures are applied to spaced-apart portions of said original.

6. The method of claim 1, wherein said regulating step comprises modifying the quantity of copying light as a function of at least one parameter of said original.

7. The method of claim 6, wherein said parameter is the difference between the densities of said test exposure and said images.

8. A method of reproducing images which are exposed on a color original, particularly a color negative, before the original is treated in a developing machine, comprising the steps of applying to the original outside of said images two test exposures, one being applied to one portion of the original prior to exposure of the original to scene light, and the other being applied to another portion of the original spaced-apart from said one portion shortly before the development of the original; separately monitoring the characteristics of each of said test exposures in each of the primary colors subsequent to development of said original; ascertaining the differences between the monitored characteristics of said test exposures; monitoring the characteristics of each image to be reproduced in each of the primary colors subsequent to development of the original; reproducing the images to be reproduced onto photosensitive material, including directing copying light against the respective images; and regulating, for each image to be reproduced, the quantity of copying light in each of the primary colors as a function of the combined results of monitoring the characteristics of said test exposures and the respective image, including selecting the quantity of copying light as a function of deviation of said differences from the results of monitoring of said images.

9. The method of claim 8, wherein said regulating step further comprises selecting said quantity of copying light on the basis of the results of monitoring said images when said differences are pronounced.

10. A method of reproducing images which are exposed on a color original, particularly a color negative, before the original is treated in a developing machine, comprising the steps of applying to the original at least one test exposure outside of said images and prior to development of the original, including exposing onto the original images of a plurality of gray filters having different densities; monitoring the characteristics of said test exposure in each of the primary colors subsequent to development of said original; monitoring the characteristics of each image to be reproduced in each of the primary colors subsequent to development of the original; reproducing the images to be reproduced onto photosensitive material, including directing copying light against the respective images; and regulating, for each image to be reproduced, the quantity of copying light in each of the primary colors as a function of the combined results of monitoring the characteristics of said test exposure and the respective image.

11. The method of claim 10, wherein said plurality consists of six gray filters.

12. The method of claim 10, wherein the density of said filters covers uniformly the exposure range of the material of said original.

13. The method of claim 12, further comprising the step of ascertaining the neutral density of each image to be reproduced, said first mentioned monitoring step including ascertaining the average density of the image of each of said filters and said regulating step including selecting for regulation of said quantity the average density of the image of one or more filters whose average density is nearest to said neutral density.

14. The method of claim 10, further comprising the step of ascertaining the neutral density of each image to be reproduced, said applying step being carried out shortly prior to development of said original, said first mentioned monitoring step including ascertaining the average density of the image of each of said filters and said regulating step including selecting for regulation of said quantity the average density of the image of one or more filters whose average density is nearest to said neutral density.

15. The method of claim 14, wherein said selecting step comprises automatically selecting the average densities of the images of two filters whose average densities are nearest to said neutral density.

16. Apparatus for reproducing images which are exposed on a color original, particularly a color negative before the original is treated in a developing machine, said original being provided with exposures of a series of gray filters having different densities, comprising signal generating means for monitoring the density of said exposures in each of the primary colors; signal generating means for monitoring the density of said images in each of the primary colors; and means for regulating the quantity of copying light in each of the primary colors for the making of reproductions of said images on photosensitive material on the basis of signals furnished by both said monitoring means.

17. The apparatus of claim 16, wherein said regulating means comprises a computer.

18. The apparatus as defined in claim 16, wherein said first mentioned monitoring means comprises three monitoring elements each sensitized in a different primary color, and means for placing said elements into register with successive exposures of said filters, said regulating means comprising means for storing the signals transmitted by said elements.

19. The apparatus of claim 18, wherein said elements transmit signals denoting the transmissivity of said exposures and said first mentioned monitoring means further comprises means for converting said last mentioned signals into signals denoting the density of said exposures in the respective colors.

20. A method of reproducing images which are exposed on a color original, particularly a color negative, before the original is treated in a developing machine, comprising the steps of applying to the original at least one test exposure outside of said images and prior to development of the original; monitoring the characteristics of said test exposure in each of the primary colors subsequent to development of said original, including ascertaining the differences between blue and green densities (d f b−d f g) and red and green densities (d f r−d f g) in dependency on neutral density $\frac{1}{3}$(d f b+d f g+d f r) of said test exposure; monitoring the characteristics of each image to be reproduced in each of the primary colors subsequent to development of the original; reproducing the images to be reproduced onto photosensitive material, including directing copying light against the respective images; and regulating, for each image to be reproduced, the quantity of copying light in each of the primary colors as a function of the combined results of monitoring the characteristics of said test exposure and the respective image.

21. The method of claim 20, wherein said applying step comprises exposing the images of a series of gray filters having different densities and said first mentioned monitoring step comprises ascertaining said differences for the image of each of said filters.

22. A method of reproducing images which are exposed on a color original, particularly a color negative, before the original is treated in a developing machine, comprising the steps of applying to the original at least one test exposure outside of said images and prior to development of the original; monitoring the characteristics of said test exposure in each of the primary colors subsequent to development of said original; monitoring the characteristics of each image to be reproduced in each of the primary colors subsequent to development of the original; reproducing the images to be reproduced onto photosensitive material, including directing copying light against the respective images; and regulating, for each image to be reproduced, the quantity of copying light in each of the primary colors as a function of the combined results of monitoring the characteristics of said test exposure and the respective image, including automatically ascertaining, in each of the primary colors, the control density on the basis of said combined results, ascertaining the exposure time for the making of a satisfactory reproduction of a calibration sample, and selecting the quantity of copying light in said primary colors on the basis of a comparison of said control density with said exposure time.

23. The method of claim 22, wherein said selecting step comprises determining the interval of exposure of each image to copying light in each of the primary colors.

24. The method of claim 22, wherein said selecting step comprises exposing the images to be reproduced to copying light in each of the primary colors for identical intervals of time and varying the intensity of copying light in the primary colors.

* * * * *